US012632141B2

(12) United States Patent　　　　　(10) Patent No.:　　US 12,632,141 B2
Kim et al.　　　　　　　　　　　　　　(45) Date of Patent:　　　May 19, 2026

(54) TOUCH DISPLAY DEVICE, DRIVING SIGNAL OUTPUT CIRCUIT, AND DRIVING SIGNAL OUTPUT METHOD OF TOUCH DISPLAY DEVICE

(71) Applicant: LX Semicon Co., Ltd., Daejeon (KR)

(72) Inventors: Kyung Hwan Kim, Daejeon (KR);
　　　　　　　Duck Hwan Lee, Daejeon (KR)

(73) Assignee: LX Semicon Co., Ltd., Daejeon (KR)

( * ) Notice:　　Subject to any disclaimer, the term of this
　　　　　　　patent is extended or adjusted under 35
　　　　　　　U.S.C. 154(b) by 10 days.

(21) Appl. No.: 17/817,633

(22) Filed:　　Aug. 4, 2022

(65)　　　　　　Prior Publication Data

US 2023/0048321 A1　　Feb. 16, 2023

(30)　　　Foreign Application Priority Data

Aug. 5, 2021　　(KR) ........................ 10-2021-0102895

(51) Int. Cl.
　　*G06F 3/041*　　　　(2006.01)
(52) U.S. Cl.
　　CPC ...... *G06F 3/04166* (2019.05); *G06F 3/04184*
　　　　　　　　　　　　　　　　　　　　　(2019.05)
(58) Field of Classification Search
　　CPC .... G06F 3/04166; G06F 3/04184; G06F 1/26;
　　　　　　　　　G06F 3/0412; G09G 2310/08; G09G
　　　　　　　　　　　　　　　2330/04; G09G 3/3655
　　See application file for complete search history.

(56)　　　　　　References Cited

U.S. PATENT DOCUMENTS 8,952,913 B2　　2/2015　Lee et al.
　9,189,087 B2　　11/2015　Kim

|  |  |  |  |
|---|---|---|---|
| 9,846,502 B2 | 12/2017 | Lee | |
| 10,698,515 B2 * | 6/2020 | Cho ...................... | G06F 3/0412 |
| 11,194,201 B2 | 12/2021 | Kang et al. | |
| 2010/0253638 A1 * | 10/2010 | Yousefpor ............. | G06F 3/0443 |
| | | | 345/173 |
| 2014/0062943 A1 * | 3/2014 | Choi ..................... | G06F 3/0446 |
| | | | 345/174 |
| 2015/0179133 A1 * | 6/2015 | Lee ....................... | G06F 3/0443 |
| | | | 345/174 |
| 2017/0102825 A1 * | 4/2017 | Kim .................... | G06F 3/04166 |

(Continued)

FOREIGN PATENT DOCUMENTS

KR　　　　10-1305924 B1　　9/2013
KR　　10-2016-0149885 A　　12/2016

(Continued)

OTHER PUBLICATIONS

Korean Office Action dated Sep. 5, 2025 issued in Patent Application No. 10-2021-0102895 (7 pages).

(Continued)

*Primary Examiner* — Lunyi Lao

*Assistant Examiner* — Jarurat Suteerawongsa

(74) *Attorney, Agent, or Firm* — Polsinelli

(57)　　　　　　　ABSTRACT

The present disclosure relates to a touch display device, a driving signal output circuit, and a driving signal output method of the touch display device. The present disclosure provides a touch display device, a driving signal output circuit, and a driving signal output method of the touch display device, for selectively outputting to a panel a display driving signal and a touch driving signal, which have different voltage levels.

19 Claims, 17 Drawing Sheets

(56) References Cited

U.S. PATENT DOCUMENTS

| | | | | |
|---|---|---|---|---|
| 2018/0107309 A1* | 4/2018 | Endo | ..................... | G06F 3/0416 |
| 2019/0384446 A1* | 12/2019 | Chang | ................... | G06F 3/0416 |
| 2021/0191555 A1* | 6/2021 | Jo | ........................ | G09G 3/3674 |
| 2021/0191561 A1* | 6/2021 | Kim | ................... | G06F 3/04164 |

FOREIGN PATENT DOCUMENTS

| | | | |
|---|---|---|---|
| KR | 20200018074 | A | 2/2020 |
| KR | 10-2020-0145010 | A | 12/2020 |
| KR | 10-2021-0082825 | A | 7/2021 |
| KR | 20220009150 | A | 1/2022 |
| KR | 20220080953 | A | 6/2022 |
| TW | 201407427 | A | 2/2014 |
| WO | 2018058665 | A1 | 4/2018 |

OTHER PUBLICATIONS

Taiwanese Office Action dated Mar. 30, 2026 issued in Patent Application No. 11520316350 (12 pages).

* cited by examiner

*FIG. 4*

TOUCH DISPLAY DEVICE, DRIVING SIGNAL OUTPUT CIRCUIT, AND DRIVING SIGNAL OUTPUT METHOD OF TOUCH DISPLAY DEVICE

CROSS REFERENCE TO RELATED APPLICATION

This application claims priority from Republic of Korea Patent Application No. 10-2021-0102895, filed on Aug. 5, 2021, which is hereby incorporated by reference in its entirety.

BACKGROUND

1. Field of Technology

The present disclosure relates to a touch display device, a driving signal output circuit, and a driving signal output method of the touch display device.

2. Description of the Prior Art

As informatization progresses, various display devices that can visualize information are being developed. A liquid crystal display (LCD), an organic light emitting diode (OLED) display device, a plasma display panel (PDP) display device, and the like are display devices that have been developed or are being developed until recently. Such display devices are being in progress to properly display high-resolution images.

Recently, many of display panels included in various electronic devices (e.g., mobile devices) employ touch functions. In this case, the display panel may be implemented as a flat panel display device such as a liquid crystal display device, and the touch function may be implemented as a touch panel combined with the display panel. The touch panel refers to a transparent switch panel having a function of operating a device or executing a program in response to a user's manipulation of pressing a text, an image, or an icon.

The touch panel may be configured to perform touch recognition capacitively, and as an example of the touch panel that implements capacitive touch recognition, "mutual capacitance touch sensing device" has been disclosed as "US Patent Application Publication No. US 2009/0091551". A general touch pattern has a structure independent of the display panel and is manufactured separately and combined with the display panel. The configuration in which the touch panel and the display panel are combined as described above causes various difficulties such as process complexity and an increase in manufacturing cost.

To solve this problem, development of a device in which parts for display and parts for touch recognition can be shared is being promoted, and a representative example thereof is an in-cell method. The in-cell method means implementing touch recognition through a configuration that implements a touch function in pixels of a display panel, and is being developed in various ways. A pixel implemented in the in-cell method may have a function of simultaneously implementing display and touch recognition.

When a touch operation and a display operation are implemented in time division in a device that provides both the touch function and the display function (hereinafter referred to as a 'touch display device'), a display driving signal (Display VCOM) and a touch driving signal (Touch VCOM) may be switched to be selectively supplied to a panel (e.g., a touch display panel or a touch screen panel).

In case that signal magnitudes of the display driving signal and the touch driving signal are not the same voltage level, a circuit for selectively supplying the display driving signal and the touch driving signal to the panel (e.g., source driver and touch readout IC (SRIC)) needs to include components capable of operating in a relatively wide voltage range (e.g., high voltage (HV)). As such, since components capable of operating in a relatively wide voltage range are included in configuring the touch display device, which results in a relatively large area occupation and a high cost. In addition, an external power supply and an internal step-up circuit may be required to reduce the resistance of the components capable of operating in a relatively wide voltage range.

SUMMARY OF THE INVENTION

In view of the above, the present disclosure provides a touch display device and a driving signal output circuit which include components capable of operating in a relatively narrow voltage range (e.g., medium voltage (MV)) to selectively output a display driving signal and a touch driving signal with different voltage levels to a panel, and a driving signal output method of the touch display device In accordance with an aspect of the present disclosure, there is provided a driving signal output circuit including: a display driving signal output circuit that operates in a first voltage range, receives a display driving signal having the first voltage range through a first terminal, and outputs a first signal based on the received display driving signal to a panel in a first time period; and a touch driving signal output circuit that operates in a second voltage range, receives a touch driving signal having the second voltage range through a second terminal, and outputs a second signal based on the received touch driving signal in a second time period different from the first time period.

In accordance with another aspect of the present disclosure, there is provided a touch display device including: a touch control circuit that generates a touch synchronization signal; a power management circuit that receives the touch synchronization signal from the touch control circuit and outputs a display driving signal having a first voltage range based on the received touch synchronization signal; a touch modulation circuit that receives the touch synchronization signal from the touch control circuit and outputs a touch driving signal having a second voltage range based on the received touch synchronization signal; and a driving signal output circuit that receives a display driving signal having the first voltage range from the power management circuit, receives the touch driving signal having the second voltage range from the touch modulation circuit, outputs a first signal based on the received display driving signal in a first time period, and outputs a second signal based on the received touch driving signal in a second time period different from the first time period.

In accordance with still another aspect of the present disclosure, there is provided a driving signal output method of a touch display device, including: receiving a display driving signal having a first voltage range from a power management circuit; receiving a touch driving signal having a second voltage range from a touch modulation circuit; outputting a first signal based on the received display driving signal to a panel in a first time period; outputting a second signal based on the received touch driving signal to the panel in a second time period different from the first time period;

and performing a discharge in order to prevent a voltage exceeding a breakdown voltage from being applied in at least some time periods in which the first signal or the second signal is not output.

As described above, according to one embodiment of the present disclosure, although the display driving signal and the touch driving signal have different voltage levels, it is possible to design a multiplexer (e.g., readout (RO) channel (CH) multiplexer (MUX)) of the driving signal output circuit using only the components with a relatively narrow operating range (e.g., medium voltage (MV) components).

Accordingly, the touch display device can be implemented with a relatively small area by using only the components with a relatively narrow operating range, which enables cost reduction due to the decrease in the number of components.

In addition, by designing a channel multiplexer (CH MUX) of a driving signal output circuit (e.g., source driver and touch readout IC (SRIC)) using only a device with a relatively narrow operating range, additional external HV power supply and internal boosting circuit is unnecessary, has a relatively small resistance value in the touch modulation IC (TMIC), and the MUX for selecting the display driving signal and the touch driving signal is unnecessary, which may reduce the size of the TMIC.

BRIEF DESCRIPTION OF THE DRAWINGS

FIG. 4 is a detailed configuration diagram of the touch display device according to one embodiment.

DETAILED DESCRIPTION OF THE EXEMPLARY EMBODIMENTS

Hereinafter, preferred embodiments of the present disclosure will be described in detail with reference to the accompanying drawings. The terms used in the present specification and the claims are not limited to ordinary or dictionary meanings and should be interpreted as meanings and concepts conforming to the technical matters of the present disclosure.

The configurations shown in the embodiments described in the present specification and the drawings are preferred embodiments of the present disclosure and do not represent all of the technical spirit of the present disclosure, so that there may be various equivalents and modified examples that may replace them at the time of filing the present application.

A touch display device according to one embodiment may perform a display and a touch recognition in a time division manner, and may include a configuration in which components for the display and components for the touch recognition are shared in an embedded in-cell manner, but the present embodiments are not limited to the time division method or the in-cell method. For example, a touch display device according to embodiments to be described below may be implemented in an on-cell method of an external method or an embedded method.

According to various embodiments, the display and the touch recognition of the touch display device may be implemented in separate operations. Here, the display means to represent a desired image by driving pixels of the display panel, and the touch recognition means to recognize a touch position on the display panel. In addition, the time division method means that the display and the touch recognition are alternately performed per each time domain.

Specifically, in the time division method, the display and the touch recognition may be implemented to alternately operate in unit of frame forming an image. That is, the display and the touch recognition may be alternately performed corresponding to a plurality of frames forming an image. In addition, in the time division method, the touch recognition may be implemented to be performed two or more times within each frame forming an image.

The in-cell method means that the display and the touch recognition may be performed on pixels in the display panel, and the component shared therefor may be a component capable of providing a capacitance for the touch recognition, and may include at least a connection point of the component. An example of the connection point may be a node COM for applying a common voltage, but is not limited thereto, and various components may be used as the connection point in accordance with the intention of a manufacturer.

Figure 1:
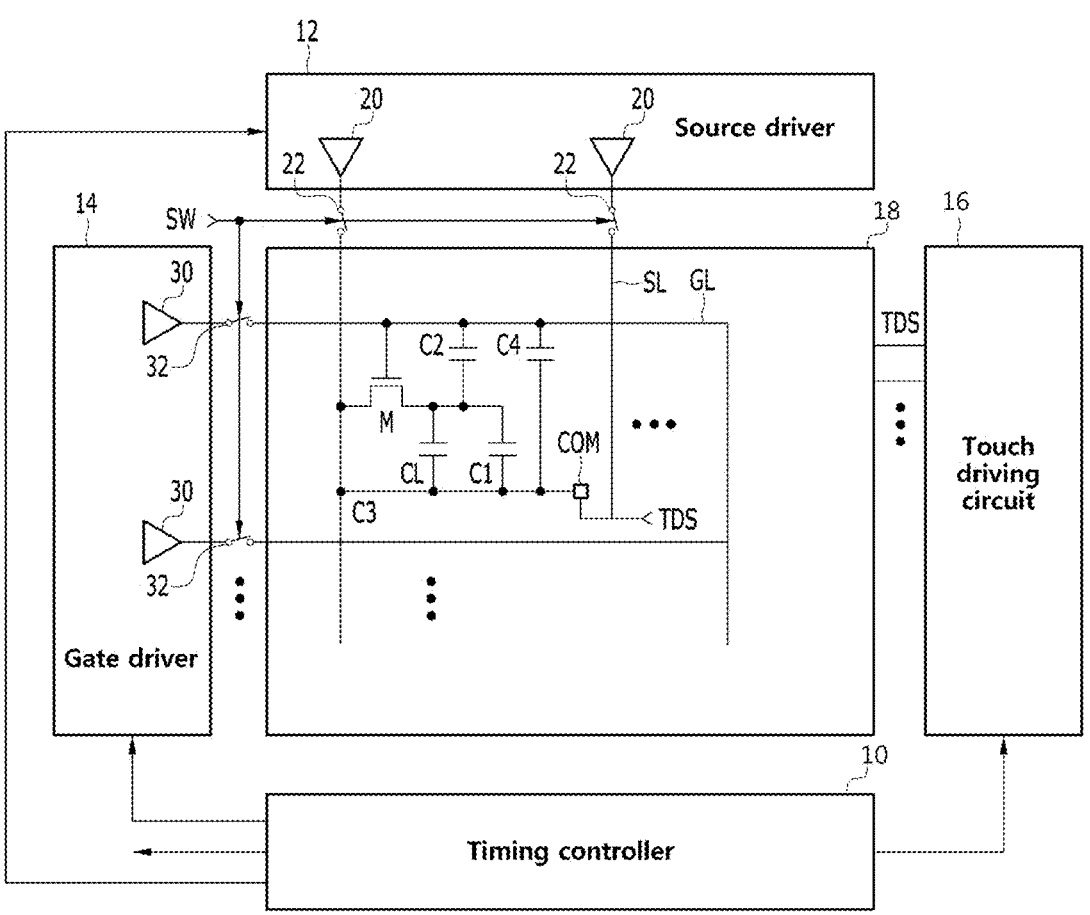
FIG. 1 is a configuration diagram of a display device according to one embodiment.
Figure 3:
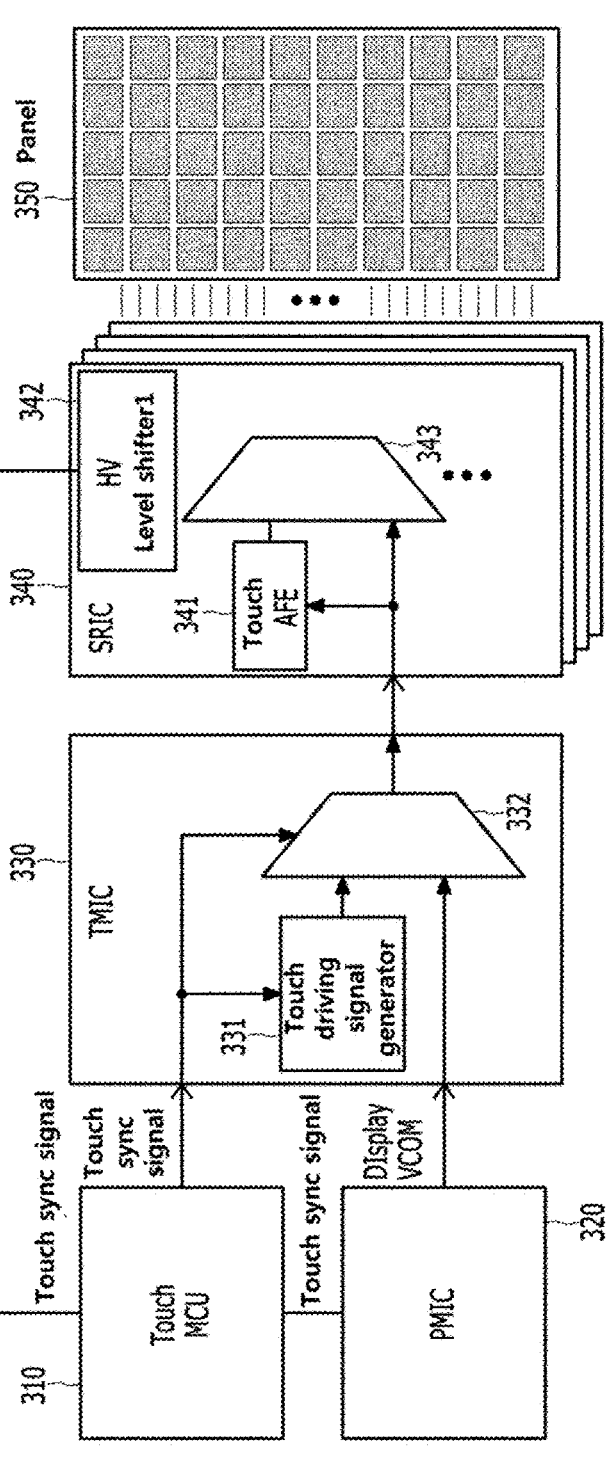
FIG. 3 is a detailed configuration diagram of the touch display device according to one embodiment.

Referring to FIG. 1, one embodiment of the present disclosure may include a timing controller (T-CON) 10, a source driver 12 (or a display driving circuit), a gate driver 14, a touch driving circuit 16, and a panel 18. According to one embodiment, the source driver 12 and the touch driving circuit 16 may be configured as a single driving signal output circuit (e.g., a source driver and touch readout IC (SRIC)) as shown in FIG. 3 to be described later.

The timing controller 10 is configured to provide a display control signal to the source driver 12 and the gate driver 14 so that the display and the touch recognition are executed in a time division manner, and to provide a touch control signal to the touch driving circuit 16.

The timing controller 10 may output a display control signal including a control signal such as a source control signal, a gate control signal, a clock pulse, a horizontal synchronization signal or a vertical synchronization signal, a switching signal SW, and the like.

The source driver 12 is configured to receive the source control signal included in the display control signal, generate a source driving signal corresponding to the source control signal, and provide the generated source driving signal to pixels of the panel 18. The source driver 12 may typically include a latch, a digital-to-analog converter, and an output buffer, and a buffer 20 in FIG. 1 corresponds to the output buffer. Here, the latch stores data according to the source control signal and provides the data to the digital-analog converter, and the digital-analog converter outputs an analog signal of a voltage corresponding to the input data. The output buffer transmits the output of the digital-to-analog converter to the pixel of the panel 18 through a source line SL as a source driving signal.

The gate driver 14 receives the gate control signal included in the display control signal, generates a gate driving signal corresponding to the gate control signal, and provides the gate driving signal to the pixels of the panel 18. The gate driver 14 may typically include an input buffer, a shift register, a level shifter, and an output buffer, and a buffer 30 in FIG. 1 corresponds to the output buffer.

The input buffer receives the gate control signal and outputs the gate control signal to the shift register, and the shift register controls scan pulses, which are gate signals transmitted through the input buffer, to be sequentially generated in units of columns of the panel 18. The level shifter has a function of changing an output voltage level of the shift register to have a level at which a thin film transistor (TFT) composed of a switch M can be turned on and off, and the output buffer changes the signal output from the level shifter to drive a gate line GL having a RC load and outputs the signal as the gate driving signal.

Switches 22 and 32 may be formed on the source line SL and the gate line GL connected to the buffer 20 forming an output terminal of the source driver 12 and the buffer 30 forming an output terminal of the gate driver 14, respectively, and the switches 22 and 32 may be configured to be included in components of the source driver 12 and the gate driver 14, or may be configured to be included in components of the panel 18.

The switches 22 and 32 may be floated or turned on by a switching signal SW output from the timing controller 10. The switches 22 and 32 may block transmission of the source driving signal and the gate driving signal to the source line SL and the gate line GL when floated. In addition, when turned on, the switches 22 and 32 transmit the source driving signal output from the source driver 12 and the gate driving signal output from the gate driver 14 to the source line SL and the gate line GL, respectively.

The panel 18 includes a plurality of pixels formed at the intersections of the source lines SL and the gate lines GL, and each of the pixels includes a switch M and a liquid crystal element CL connected thereto. The switch M of each pixel is configured to switch the source driving signal transmitted from the source driver 12 through the source line SL by the gate driving signal transmitted from the gate driver 14 through the gate line GL and transmit the switched source driving signal to the liquid crystal element CL.

The liquid crystal element CL has an optical shutter function in which light transmission is controlled by controlling the twist of the internal liquid crystal according to a voltage applied to electrodes formed at both ends, and a capacitance is disposed between the electrodes. One side of the liquid crystal element CL is connected to the switch M and the source driving signal transmitted from the switch M is applied thereto, and the other side is connected to a node COM to which a common voltage is applied. With such configurations, the liquid crystal element CL may be driven depending on a state of the source driving signal based on the common voltage applied to the node COM.

According to various embodiments, the node COM may form a connection point for touch recognition and a constant voltage provided from the touch driving circuit 16 may be applied thereto. Here, the constant voltage may correspond to a touch driving signal TDS provided from the touch driving circuit 16. The touch driving signal TDS includes a driving signal and a sensing signal, and the driving signal may be defined as a constant voltage applied to the node COM forming the connection point, and the sensing signal may be defined as a signal corresponding to a voltage change of the connection point according to a touch. That is, the touch driving signal TDS according to various embodiments may include a driving signal that is a constant voltage for driving a touch and a sensing signal that is a signal change according to sensing of the touch. In various embodiments, a common voltage for display and a constant voltage (e.g., a touch driving signal TDS) for touch recognition may be alternately applied to the node COM.

The touch driving circuit 16 is configured to receive a touch control signal provided by the timing controller 10, and to provide the touch driving signal TDS to the connection point of pixels, that is, the node COM of pixels, according to the touch control signal.

In the above configuration, the liquid crystal in the panel 18 includes pixels arranged to have a plurality of rows and columns, the source driver 12 is configured to output a source driving signal for each column of pixels, and the gate driver 14 is configured to output a gate driving signal for each row of pixels. Then, the touch driving circuit 16 may be configured to provide the touch driving signal TDS to the node COM for each column or row of pixels.

Figure 2:
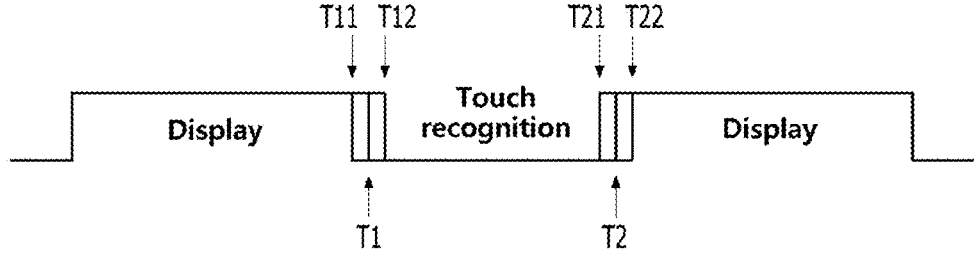
FIG. 2 is a timing diagram for explaining a method of driving a touch display device according to one embodiment.

The embodiment of FIG. 1 described above may be driven in a time division manner by alternately allocating the display and the touch recognition to continuous time domains as shown in FIG. 2.

First, the timing controller 10 provides a source control signal and a gate control signal to the source driver 12 and the gate driver 14, respectively, for display. The timing controller 10 provides a touch control signal to the touch driving circuit 16 to control the output of the touch driving signal TDS not to be activated in the time domain set as the display period.

In FIG. 2, time T1 is a time point at which the display state enters the touch recognition state, and T2 is a time point at which the touch recognition state enters the display state.

The timing controller 10 performs control for touch recognition when a set time elapses to represent an image. That is, the timing controller 10 floats the source line SL and the gate line GL connected to the pixels by floating the switches 22 and 32 to perform touch recognition. One end of the liquid crystal element CL is floated by the control of the switches 22 and 32 of the timing controller 10.

Then, the timing controller 10 activates the output of the touch driving signal TDS by providing a touch control signal to the touch driving circuit 16 to perform touch recognition. A touch driving signal TDS having a constant voltage is applied to the node COM for each pixel under the control of the timing controller 10.

In the above configuration, the timing controller 10 switches the switches 22 and 32 to a floating state at a time point T11 that is earlier than the time T1 set as the time point for entering the touch recognition state from the display state, or at a time point T12 that is later than the time T1.

The timing controller 10 may float the switch 22 on the source line SL and the switch 32 on the gate line GL simultaneously or sequentially. When the timing controller 10 sequentially floats the switch 22 and the switch 32, the timing controller 10 may first float the switch 22 on the source line SL at time T11 and then float the switch 32 on the gate line GL at time T12. On the contrary, the timing controller 10 may first float the switch 32 on the gate line GL at time T11 and then float the switch 22 on the source line SL at time T12. Here, the time period between T11 and T12 may be set as a floating period.

In a state where the source driving signal and the gate driving signal are respectively applied to the source line SL and the gate line GL for display, in view of the node COM connected to one side of the liquid crystal element CL, parasitic capacitance C1 formed in parallel with the liquid crystal element CL, parasitic capacitance C2 between the liquid crystal element CL and the gate line GL, parasitic capacitance C3 between the node COM to which the common voltage is applied and the source line SL, and parasitic capacitance C4 between the node COM to which the common voltage is applied and the gate line GL may occur. However, when the source line SL and the gate line GL are floated for touch recognition, parasitic capacitance in the pixel may not be formed in view of the node COM connected to one side of the liquid crystal element CL.

FIG. 3 is a detailed configuration diagram of the touch display device according to one embodiment. Referring to FIG. 3, the touch display device may include a touch control circuit 310 (touch micro control unit (MCU)), a power management circuit 320 (power management IC (PMIC)), a touch modulation circuit 330 (touch modulation IC (TMIC)), a driving signal output circuit 340 (e.g., a source driver and touch readout IC (SRIC)), and a panel 350. The driving signal output circuit 340 may include the function of the source driver 12 and the function of the touch driving circuit 16 described above with reference to FIG. 1.

According to one embodiment, the touch control circuit 310 may provide a synchronization signal to the power management circuit 320, the touch modulation circuit 330, and the driving signal output circuit 340. The synchronization signal may include a synchronization signal for distinguishing a display period or a touch sensing period, and the synchronization signal may be referred to as a display synchronization signal or a touch synchronization signal. The touch control circuit 310 may be configured to include at least some functions of the timing controller 10 illustrated in FIG. 1, or may be replaced with the timing controller 10.

According to one embodiment, the power management circuit 320 may receive a synchronization signal (e.g., a touch synchronization signal) from the touch control circuit 310 and output a display driving signal (Display VCOM) based on the received synchronization signal. For example, the display driving signal may have a voltage of −1V.

According to one embodiment, the touch modulation circuit 330 may include a touch driving signal generator 331 and a first multiplexer 332. The touch modulation circuit 330 may generate a touch driving signal Touch VCOM by receiving a synchronization signal from the touch control circuit 310 and modulating the signal based on the received synchronization signal. For example, the touch driving signal generator 331 may generate a touch driving signal based on a synchronization signal (e.g., a touch synchronization signal) received from the touch control circuit 310. According to one embodiment, the touch driving signal may be configured in the form of a pulse having a voltage range of 1V to 4V. The first multiplexer 332 of the touch modulation circuit 330 receives the touch driving signal output from the touch driving signal generator 331 and the display driving signal output from the power management circuit 320 to selectively output one of them. For example, the first multiplexer 332 may selectively output any one of the input display driving signal and the touch driving signal based on the synchronization signal provided from the touch control circuit 310. For example, during a display operation period for displaying an image on the panel 350, the first multiplexer 332 may output the display driving signal, and during a touch sensing operation period for sensing a touch from the panel 350, the first multiplexer 332 may output the touch driving signal. The display driving signal or the touch driving signal output from the first multiplexer 332 of the touch modulation circuit 330 may be transmitted to the driving signal output circuit 340. The touch modulation circuit 330 may be configured to include at least some functions of the touch driving circuit 16 shown in FIG. 1, or may be replaced with the touch driving circuit 16.

According to one embodiment, the driving signal output circuit 340 may include a touch analog front end (AFE) 341, a high voltage (HV) level shifter 342, and a second multiplexer 343. According to one embodiment, the HV level shifter 342 of the driving signal output circuit 340 may receive a synchronization signal from the touch control circuit 310 and supply a VDD signal to the second multiplexer 343 based on the received synchronization signal. For example, since the signal input to the second multiplexer 343 includes a display driving signal of a first voltage range and a touch driving signal of a second voltage range, the HV level shifter 342 may supply a signal HVDD (e.g., 17V) of an HV level to the second multiplexer 343.

The second multiplexer 343 of the driving signal output circuit 340 may selectively output the display driving signal in the first voltage range or the touch driving signal in the second voltage range based on the signal HVDD of the HV level supplied from the HV level shifter 342. In addition, the second multiplexer 343 may include a channel multiplexer, and may selectively output a driving signal for each channel corresponding to each pixel of the panel 350. In the description of embodiments to be described later, the function of the second multiplexer 343 that selectively outputs a driving signal for each channel will be omitted. For example, the second multiplexer 343 may output a display driving signal to the panel 350 during a display operation period for displaying an image on the panel 350, and the second multiplexer 343 may output a touch driving signal to the panel 350 during a touch sensing operation period for sensing a touch from the panel 350. According to one embodiment, during the touch sensing operation period, the second multiplexer 343 may receive a signal sensed from the panel 350 and supply it to the touch AFE 341. The touch AFE 341 may determine whether a touch is made based on the signal sensed from the panel 350. A method of determining whether a touch is made through the touch AFE 341 may use a known technique, and thus a detailed description thereof will be omitted.

According to one embodiment, since the second multiplexer 343 receives a display driving signal of the first voltage range (e.g., −1V) and a touch driving signal of the second voltage range (e.g., 1V to 4V) together through one terminal, the second multiplexer 343 may be configured using components capable of operating in a voltage range (e.g., HV (high voltage)) including both the first voltage range and the second voltage range. For example, since the second multiplexer 343 includes the HV components, the cost and area thereof may increase.

Figure 5:
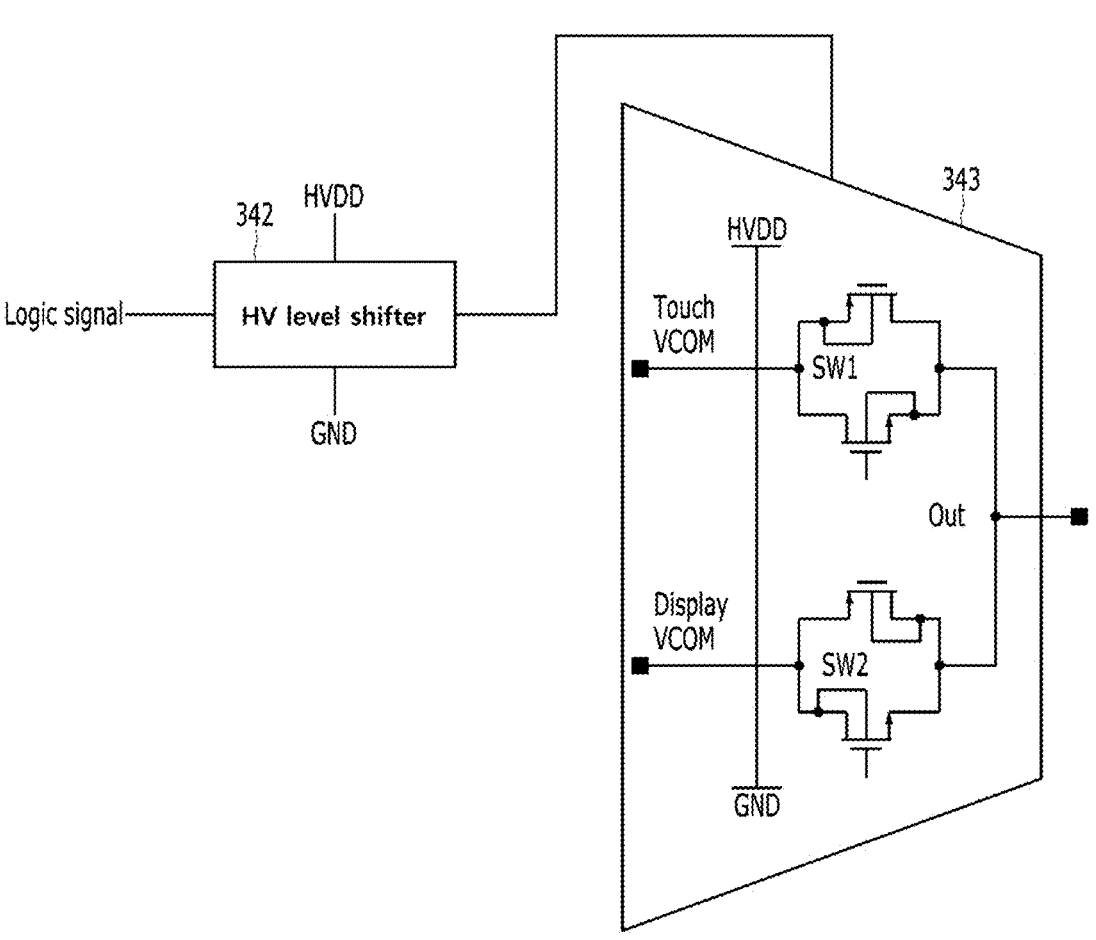
FIG. 5 is a detailed configuration diagram of a driving signal output circuit according to one embodiment.

FIG. 5 is a detailed configuration diagram of the driving signal output circuit according to one embodiment. Referring to FIG. 5, the driving signal output circuit 340 may include the HV level shifter 342 and the second multiplexer 343. As described above, since the HV level shifter 342 needs to output HVDD (e.g., 17V), it may include an HV component. The second multiplexer 343 may include an HV component to simultaneously process a display driving signal in the first voltage range (e.g., −1V) and a touch driving signal in the second voltage range (e.g., 1V to 4V). For example, the second multiplexer 343 may include a first switch SW1 for outputting a touch driving signal and a second switch SW2 for outputting a display driving signal. The first switch may include a P-type transistor (e.g., a P-type metal-oxide-semiconductor field-effect transistor (MOSFET)) and an N-type transistor (e.g., an N-type MOSFET) connected in parallel with the P-type transistor. The second switch may include a P-type transistor and an N-type transistor connected in parallel with the P-type transistor. For example, the P-type transistor or the N-type transistor constituting the first switch or the second switch may be configured using HV components.

Figure 4:
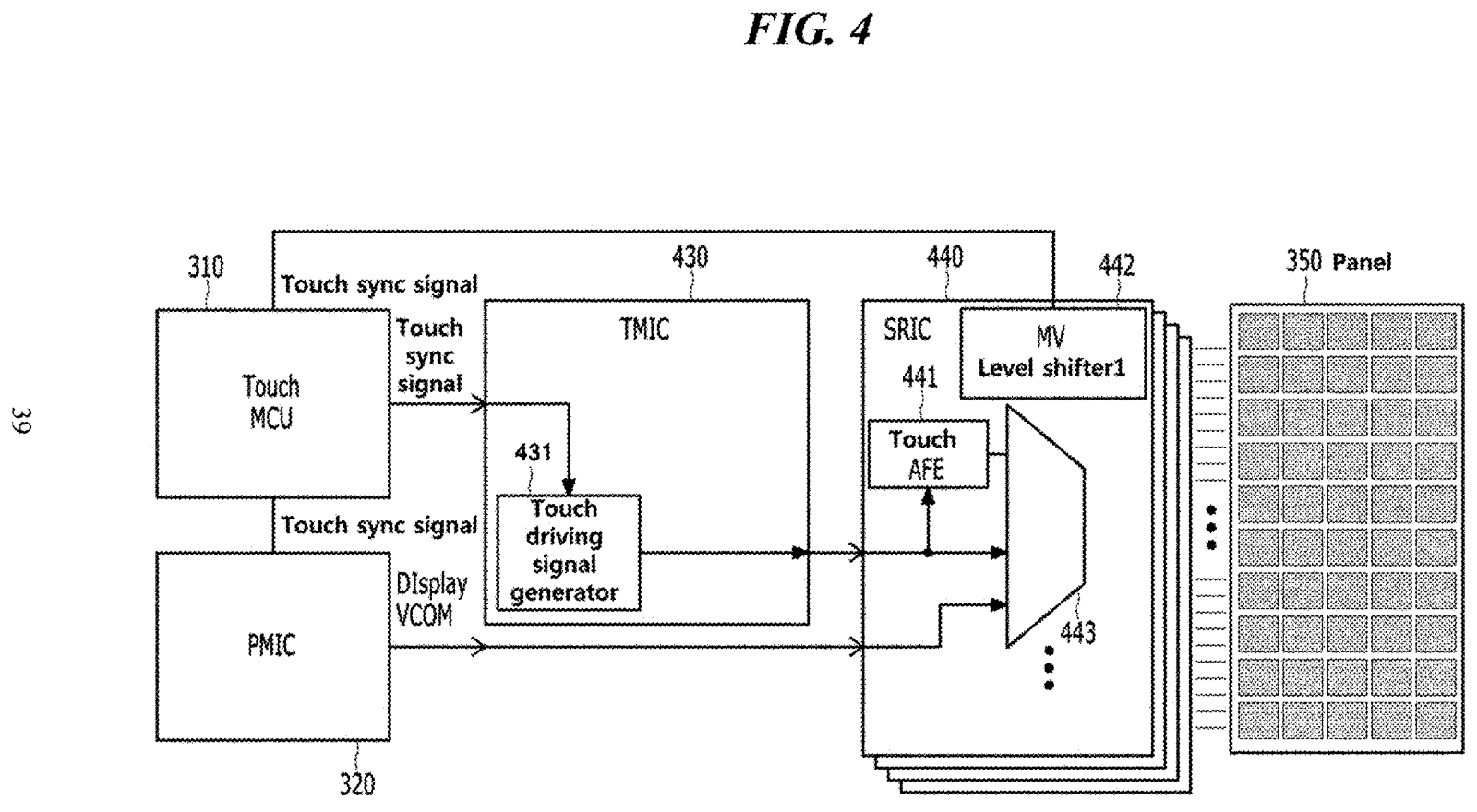

FIG. 4 is a detailed configuration diagram of the touch display device according to one embodiment. Referring to FIG. 4, the touch display device includes a touch control circuit 310 (e.g., touch MCU (micro control unit)), a power management circuit 320 (e.g., power management IC (PMIC)), and a touch modulation circuit 430 (e.g., touch modulation IC (TMIC)), a driving signal output circuit 440 (e.g., a source driver and touch readout IC (SRIC)), and a panel 350. The driving signal output circuit 440 may include the function of the source driver 12 and the function of the touch driving circuit 16 described above with reference to FIG. 1.

According to one embodiment, the touch control circuit 310 may provide a synchronization signal to the power management circuit 320, the touch modulation circuit 430, and the driving signal output circuit 440. The synchronization signal may include a synchronization signal for distinguishing a display period or a touch sensing period, and the synchronization signal may be referred to as a display synchronization signal or a touch synchronization signal. The touch control circuit 310 may be configured to include at least some functions of the timing controller 10 illustrated in FIG. 1, or may be replaced with the timing controller 10.

According to one embodiment, the power management circuit 320 may receive a synchronization signal (e.g., a touch synchronization signal) from the touch control circuit 310 and output a display driving signal Display VCOM based on the received synchronization signal. For example, the display driving signal may have a voltage of −1V.

According to one embodiment, the touch modulation circuit 430 may include a touch driving signal generator 431. The touch modulation circuit 430 may generate a touch driving signal Touch VCOM by receiving a synchronization signal from the touch control circuit 310 and modulating the signal based on the received synchronization signal. For example, the touch driving signal generator 431 may generate a touch driving signal based on a synchronization signal (e.g., a touch synchronization signal) received from the touch control circuit 310. According to one embodiment, the touch driving signal may be configured in the form of a pulse having a voltage range of 1V to 4V. The touch driving signal output from the touch driving signal generator 431 of the touch modulation circuit 430 may be transmitted to the driving signal output circuit 440. The touch modulation circuit 430 may be configured to include at least some functions of the touch driving circuit 16 illustrated in FIG. 1, or may be replaced with the touch driving circuit 16.

According to one embodiment, the driving signal output circuit 440 may include a touch analog front end (AFE) 441, a medium voltage (MV) level shifter 442, and a multiplexer 443. According to one embodiment, the MV level shifter 442 of the driving signal output circuit 440 may receive a synchronization signal from the touch control circuit 310 and supply a VDD signal to the multiplexer 443 based on the received synchronization signal. For example, the signal input to the multiplexer 443 may include a display driving signal in the first voltage range and a touch driving signal in the second voltage range, and the MV level shifter 442 may supply an MV level signal PVDD (e.g., 6V) or NVDD (e.g., −6V) to the multiplexer 443.

The driving signal output circuit 440 may receive a display driving signal having the first voltage range (e.g., −1V) output from the power management circuit 320 through a first terminal, and receive a touch driving signal with the second voltage range (e.g., 1V to 4V) output from the touch modulation circuit 430 through a second terminal distinguished from the first terminal. The display driving signal received through the first terminal and the touch driving signal received through the second terminal may be input to the multiplexer 443, respectively.

According to one embodiment, the multiplexer 443 may selectively output a display driving signal in the first voltage range or a touch driving signal in the second voltage range based on the MV level signal PVDD or NVDD supplied from the MV level shifter 442. In addition, the multiplexer 443 may include a channel multiplexer, and may selectively output a driving signal for each channel corresponding to each pixel of the panel 350. In the description of embodiments to be described later, the function of the multiplexer 443 that selectively outputs a driving signal for each channel will be omitted. For example, the multiplexer 443 may output a display driving signal to the panel 350 during a display operation period for displaying an image on the panel 350, and the multiplexer 443 may output a touch driving signal to the panel 350 during a touch sensing operation period for sensing a touch from the panel 350. According to one embodiment, during the touch sensing operation period, the multiplexer 443 may receive a signal sensed from the panel 350 and supply the input signal to the touch AFE 441. The touch AFE 441 may determine whether a touch is made based on the signal sensed from the panel 350. Since the method of determining whether a touch is made through the touch AFE 441 may use a known technique, a detailed description thereof will be omitted.

According to an embodiment, the multiplexer 443 may receive a display driving signal of the first voltage range (e.g., −1V) and a touch driving signal of the second voltage range (e.g., 1V~4V) through separate terminals, and may selectively output the display driving signal and the touch driving signal based on the MV level signal PVDD (e.g. 6V) or NVDD (e.g. −6V) provided from the MV level shifter 442.

According to one embodiment, the multiplexer 443 may include a separate circuit (e.g., a display driving signal output circuit and a touch driving signal output circuit) for processing the display driving signal and the touch driving signal, each of the circuits may be configured using MV components having a voltage range relatively narrower than that of the HV component. For example, by processing the signal of the first voltage range and the signal of the second voltage range through the separate circuits, the multiplexer 443 may be configured using components capable of operating in a medium voltage MV.

Figure 6:
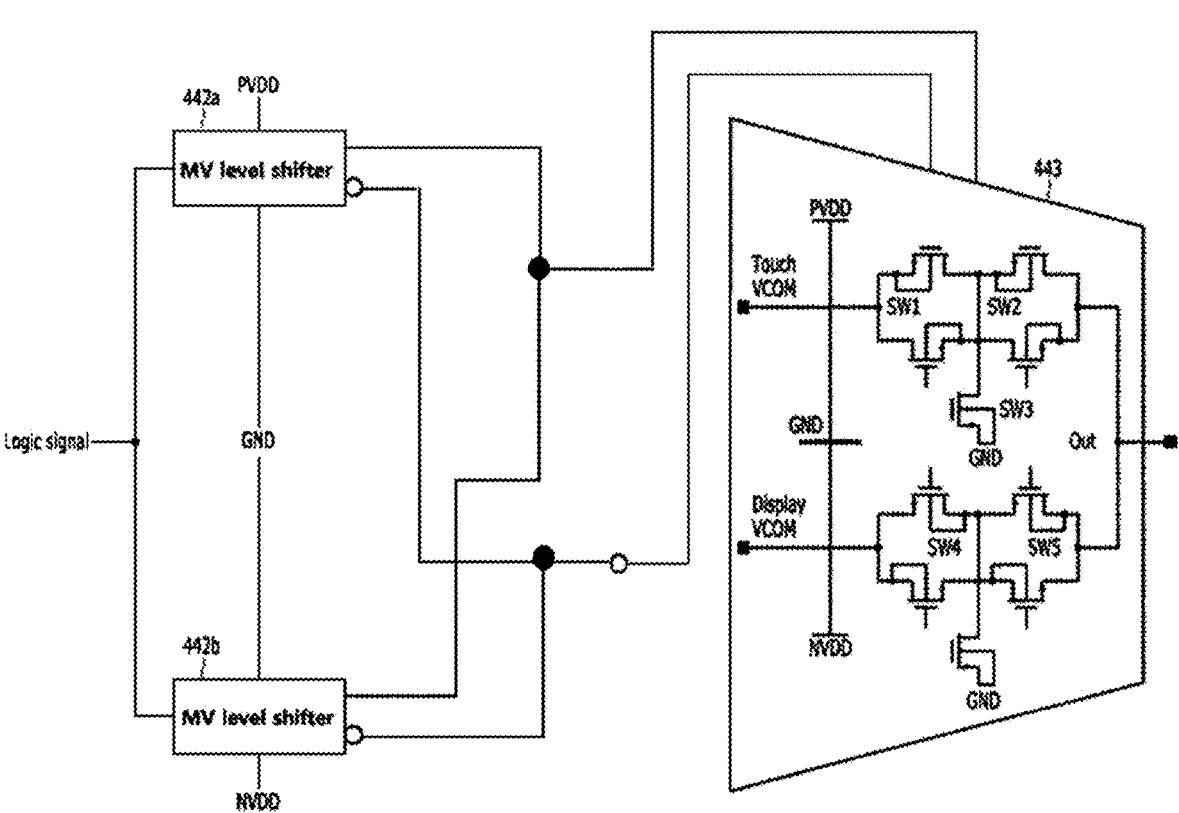
FIG. 6 is a detailed configuration diagram of the driving signal output circuit according to one embodiment.

FIG. 6 is a detailed configuration diagram of the driving signal output circuit according to one embodiment. Referring to FIG. 6, the driving signal output circuit 440 may include a first MV level shifter 442 a, a second MV level shifter 442 b, and a multiplexer 443. The first MV level shifter 442 a may receive a logic signal (e.g., 1.2V signal) to output a PVDD (e.g., 6V) signal, and the second MV level shifter 442 b may receive a logic signal (e.g., 1.2V signal)

to output an NVDD (e.g., −6V) signal. An exemplary detailed circuit of the first MV level shifter 442 *a* and the second MV level shifter 442 *b* will be described with reference to FIGS. 7A and 7B.

Figure 7A:
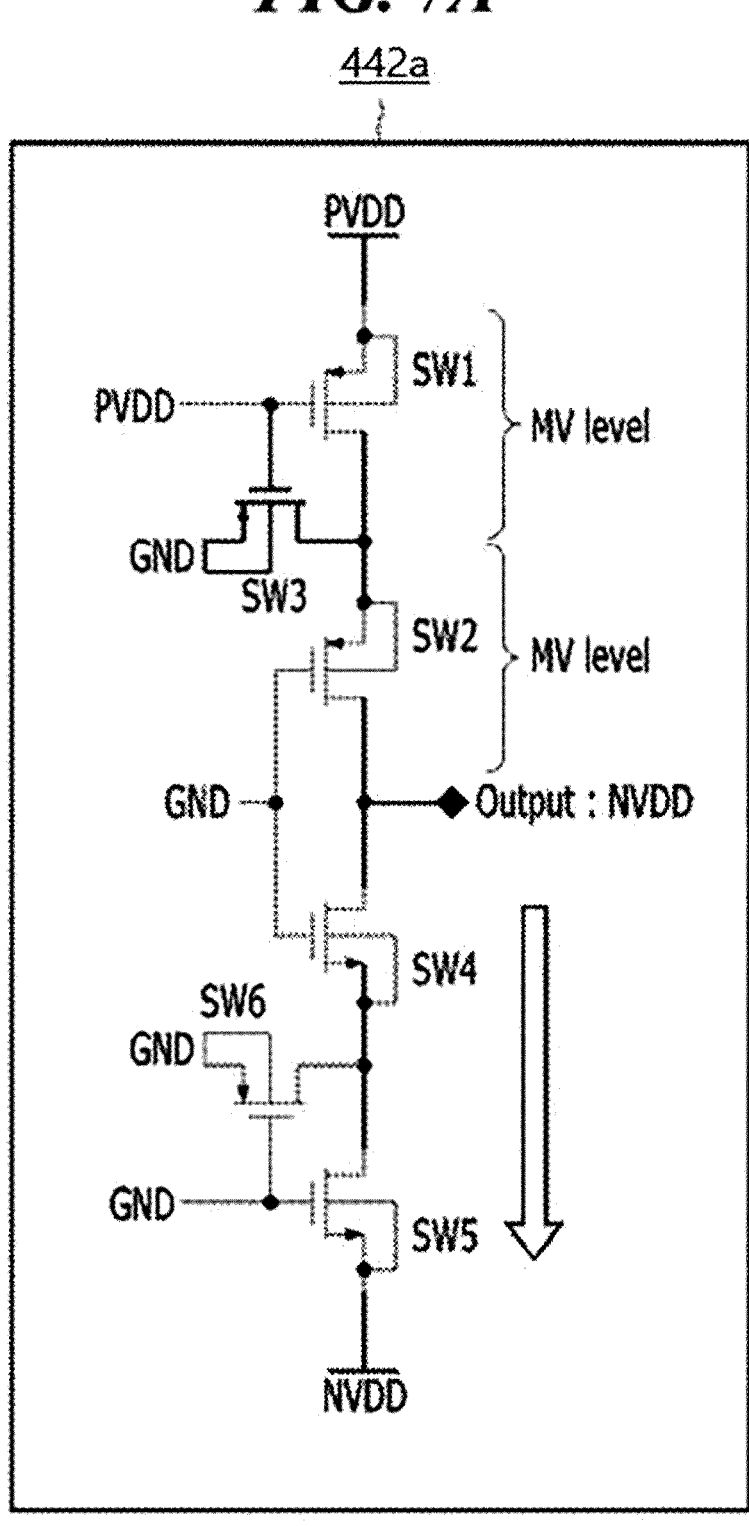
FIGS. 7A and 7B are detailed configuration diagrams of a level shifter according to one embodiment.
Figure 7B:
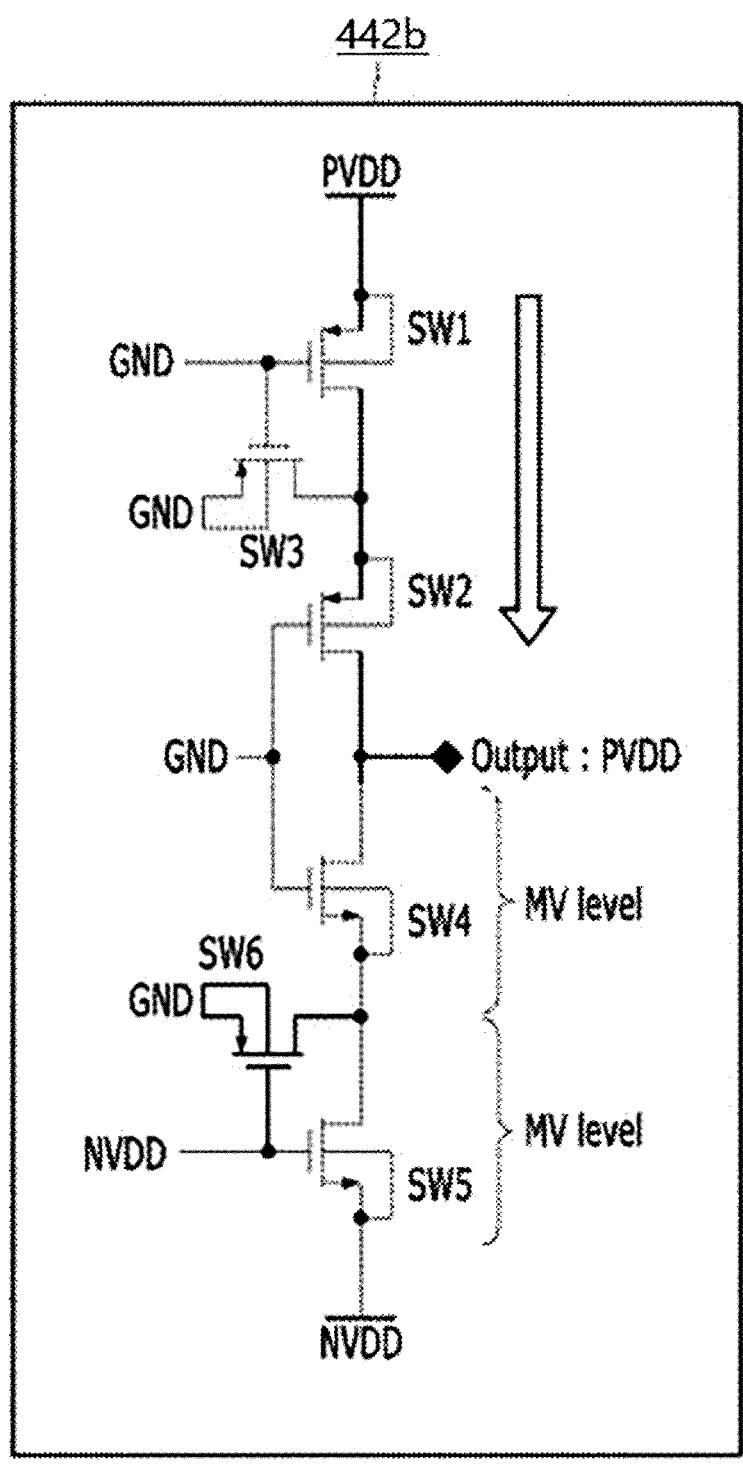

FIGS. 7A and 7B are detailed configuration diagrams of the level shifter according to one embodiment. Referring to FIG. 7A, a first MV level shifter 442*a* may include a first switch SW1, a second switch SW2, a third switch SW3, a fourth switch SW4, a fifth switch SW5, and a sixth switch SW6. The first switch SW1, the second switch SW2, and the sixth switch SW6 may include a P-type transistor (for example, a P-type metal-oxide-semiconductor field-effect transistor (MOSFET)). The third switch SW3, the fourth switch SW4, and the fifth switch SW5 may include an N type transistor (for example, an N-type MOSFET).

According to one embodiment, when a PVDD voltage is applied to a gate terminal of the first switch SW1 and a gate terminal of the second switch SW2 is grounded, no current flows between the first switch SW1 and the second switch SW2. When a gate terminal of the fourth switch SW4 and a gate terminal of the fifth switch SW5 are grounded, current flows through the fourth switch SW4 and the fifth switch SW5. According to the above operation, an NVDD voltage may be applied to an output terminal connected between the second switch SW2 and the fourth switch SW4.

Referring to FIG. 7B, the second MV level shifter 442*b* may include a first switch SW1, a second switch SW2, a third switch SW3, a fourth switch SW4, a fifth switch SW5, and a sixth switch SW6. The first switch SW1, the second switch SW2, and the sixth switch SW6 may include a P-type transistor (for example, a P-type metal-oxide-semiconductor field-effect transistor (MOSFET)). The third switch SW3, the fourth switch SW4, and the fifth switch SW5 may include an N type transistor (for example, an N-type MOS-FET).

According to one embodiment, when a gate terminal of the first switch SW1 and a gate terminal of the second switch SW2 are grounded, current flows through the first switch SW1 and the second switch SW2. When a gate terminal of the fourth switch SW4 is grounded and an NVDD voltage is applied to a gate terminal of the fifth switch SW5, no current flows through the fourth switch SW4 and the fifth switch SW5. According to the above operation, a PVDD voltage may be applied to an output terminal connected between the second switch SW2 and the fourth switch SW4.

According to one embodiment, the first MV level shifter 442*a* and the second MV level shifter 442*b* of FIGS. 7A and 7B may be configured as the same circuit so that a PVDD signal and an NVDD signal are switched and output, or may be configured as separate circuits to output the NVDD signal and the PVDD signal. The PVDD signal and the NVDD signal output from the MV level shifter 442 may be supplied as a VDD signal for controlling the gate of each transistor included in the multiplexer 443.

As described above, the MV level shifter 442 may include an MV element since the MV level shifter 442 needs to output PVDD (e.g., 6V) and NVDD (e.g., −6V). According to the above configuration, the MV level shifter 442 may not further include an additional external HV power source and an internal boost circuit.

Figure 8:
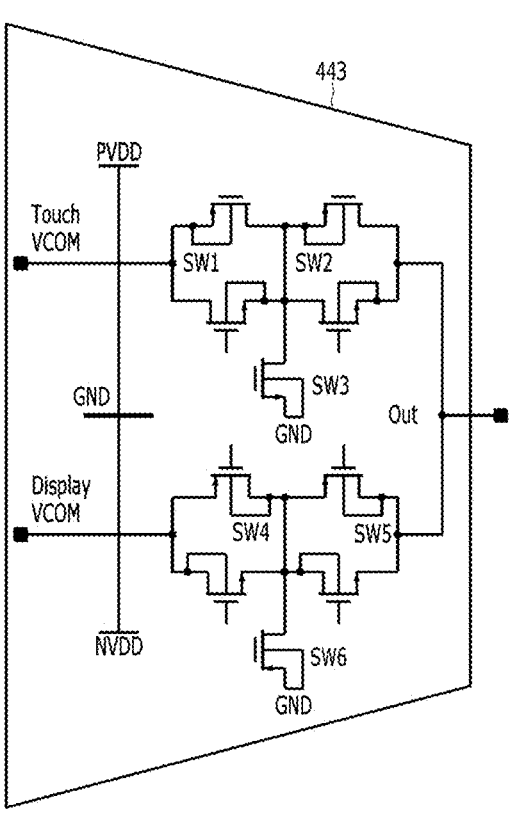
FIG. 8 is a detailed configuration diagram of the driving signal output circuit according to one embodiment.

FIG. 8 is a detailed configuration diagram of the driving signal output circuit according to one embodiment. Referring to FIG. 8, the multiplexer 443 of the driving signal output circuit 440 may include a first switch SW1 for receiving a touch driving signal Touch VCOM having the second voltage range (e.g., 1V to 4V), a second switch SW2, connected in series with the first switch, for receiving the touch driving signal from the first switch and outputting a second signal to the panel 350, and a third switch SW3 connected between the first switch and the second switch. The first switch SW1, the second switch SW2, and the third switch SW3 may be referred to as a touch driving signal output circuit. The third switch SW3 may be controlled to discharge to prevent a voltage exceeding a breakdown voltage from being applied to the first switch SW1 or the second switch SW2 in at least a partial time period where the second signal is not output through the second switch SW2. An operation of the touch driving signal output circuit will be described later with reference to FIGS. 9 and 10.

In accordance with one embodiment, the first switch SW1 may include a P-type transistor and an N-type transistor connected in parallel with the P-type transistor. The second switch SW2 may include a P-type transistor and an N-type transistor connected in parallel with the P-type transistor. The third switch SW3 may include an N-type transistor.

According to an embodiment, the multiplexer 443 of the driving signal output circuit 440 may include a fourth switch SW4 for receiving a display driving signal Display VCOM having the first voltage range (e.g., −1V), a fifth switch SW5, connected in series with the fourth switch, for receiving the display driving signal from the fourth switch and outputting a first signal to the panel 350, and a sixth switch SW6 connected between the fourth switch SW4 and the fifth switch SW5. The fourth switch SW4, the fifth switch SW5, and the sixth switch SW may be referred to as a display driving signal output circuit. The sixth switch SW6 may be controlled to discharge so that a voltage exceeding a breakdown voltage is not applied to the fourth switch SW4 or the fifth switch SW5 in at least a partial time period in which the first signal is not output through the fifth switch SW5. The operation of the display driving signal output circuit will be described later with reference to FIGS. 9 and 10.

According to one embodiment, the fourth switch SW4 may include a P-type transistor and an N-type transistor connected in parallel with the P-type transistor. The fifth switch SW5 may include a P-type transistor and an N-type transistor connected in parallel with the P-type transistor. The sixth switch SW6 may include a P-type transistor.

Hereinafter, an operation of the multiplexer 443 included in the driving signal output circuit 440 will be described in detail with reference to FIGS. 9 and 10.

Figure 9:
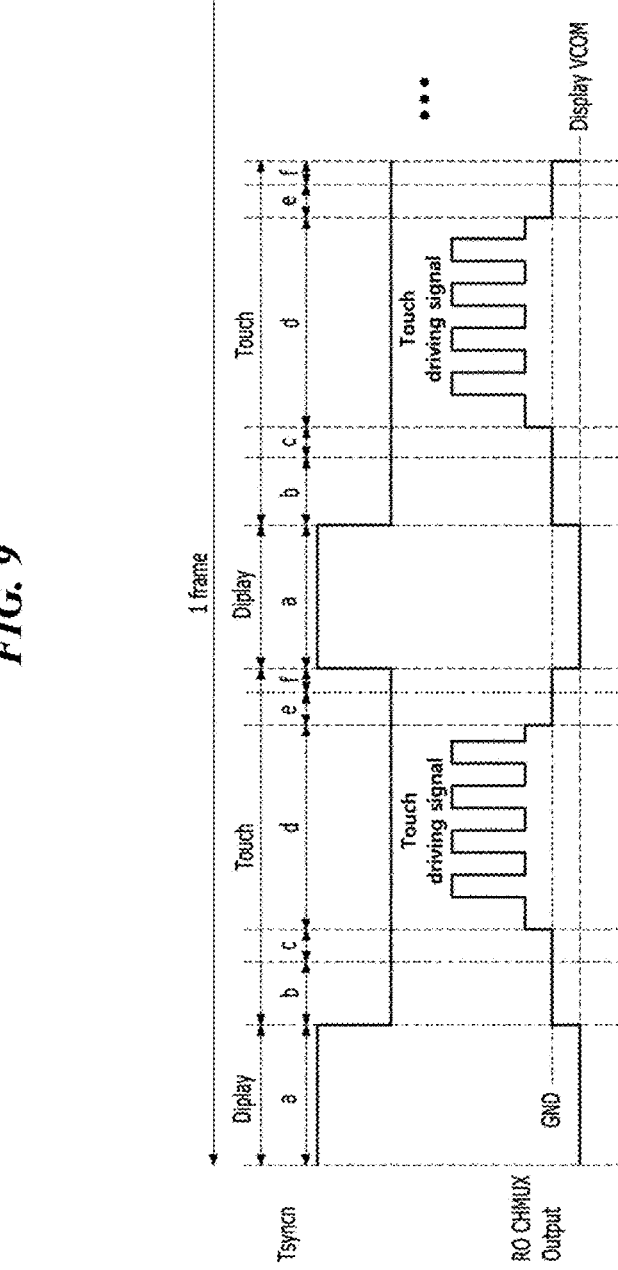
FIG. 9 is a timing diagram for explaining the method of driving a touch display device according to one embodiment.

FIG. 9 is a timing diagram for explaining the method of driving a touch display device according to one embodiment. Referring to FIG. 9, the touch display may operate in a display mode in a time period "a" and operate in a touch sensing mode in time periods "b", "c", "d", "e", and "f".

According to one embodiment, the multiplexer 443 may output a display driving signal (e.g., −1V) in the time period "a" and output a touch driving signal (e.g., 1V to 4V) toggled in the time period "d". In addition, the multiplexer 443 may be grounded in the time periods "b", "c", "e", and "f" so that no signal is output. In the following description, for convenience of description, the time period "a" may be referred to as a display period, the time periods "b" and "e" may be referred to as a ground (GND) discharge period, the time periods "c" and "f" may be referred to as a floating period, and the time period "d" may be referred to as a touch sensing period.

Figure 10A:
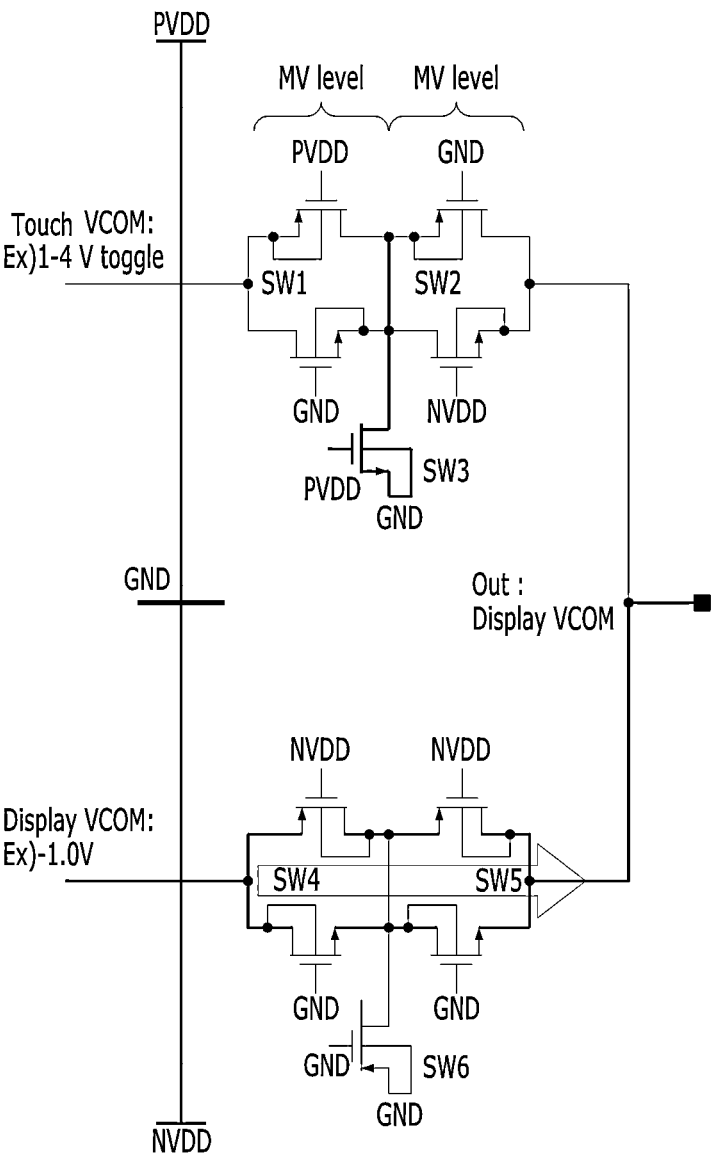
FIGS. 10A, 10B, 10C, 10D, 10E, and 10F are diagrams illustrating operations of respective periods of the driving signal output circuit according to one embodiment.
Figure 10B:
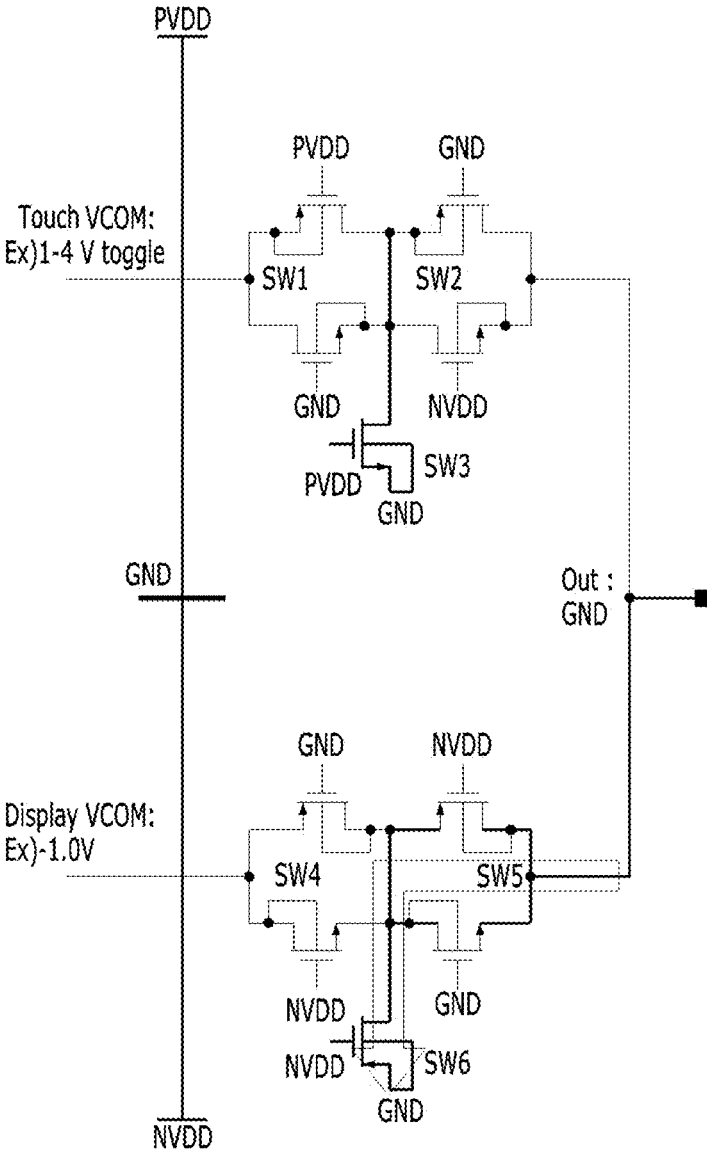
Figure 10C:
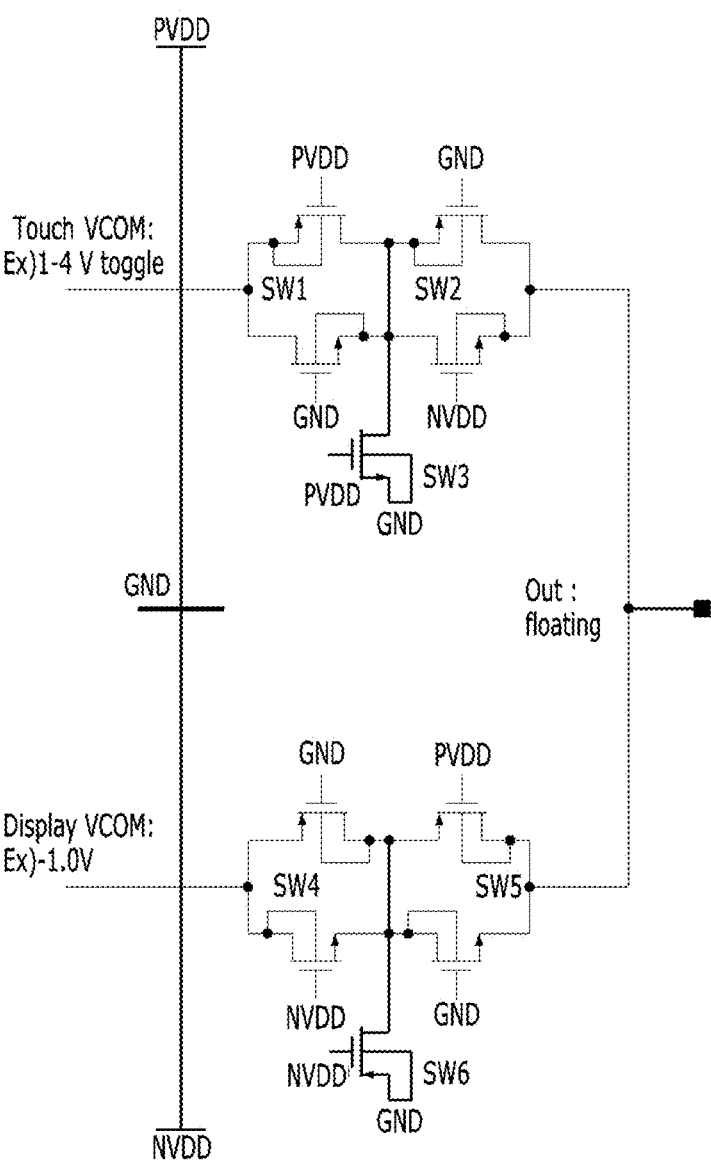
Figure 10D:
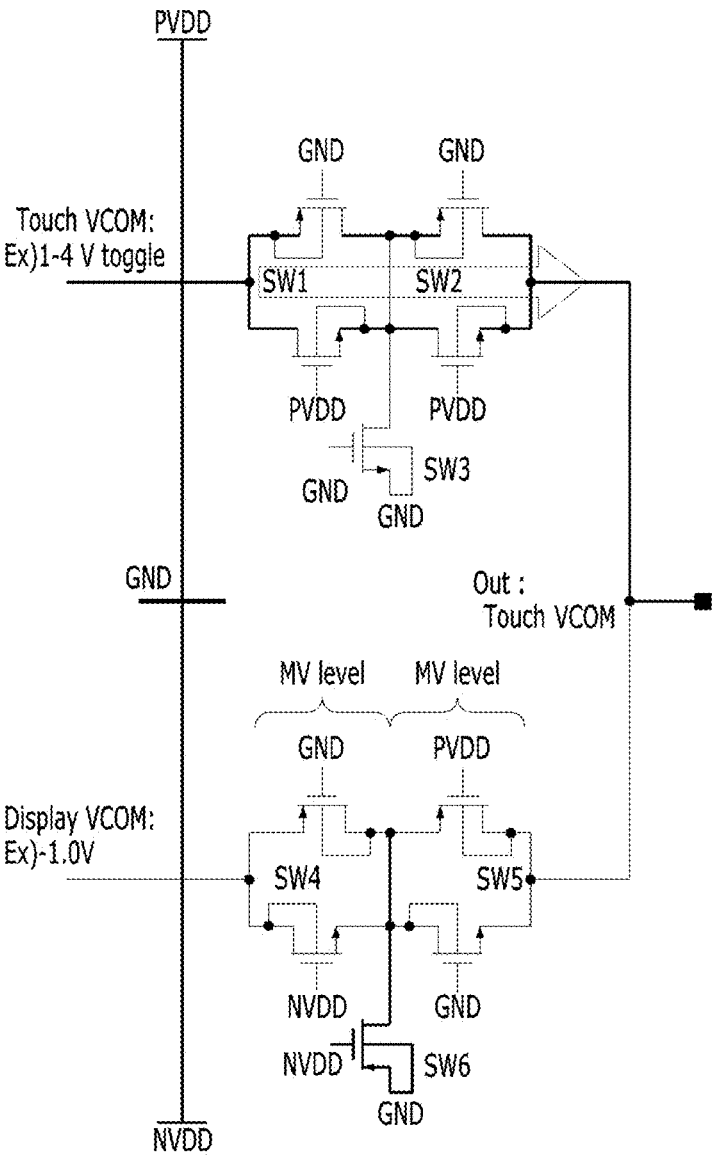
Figure 10E:
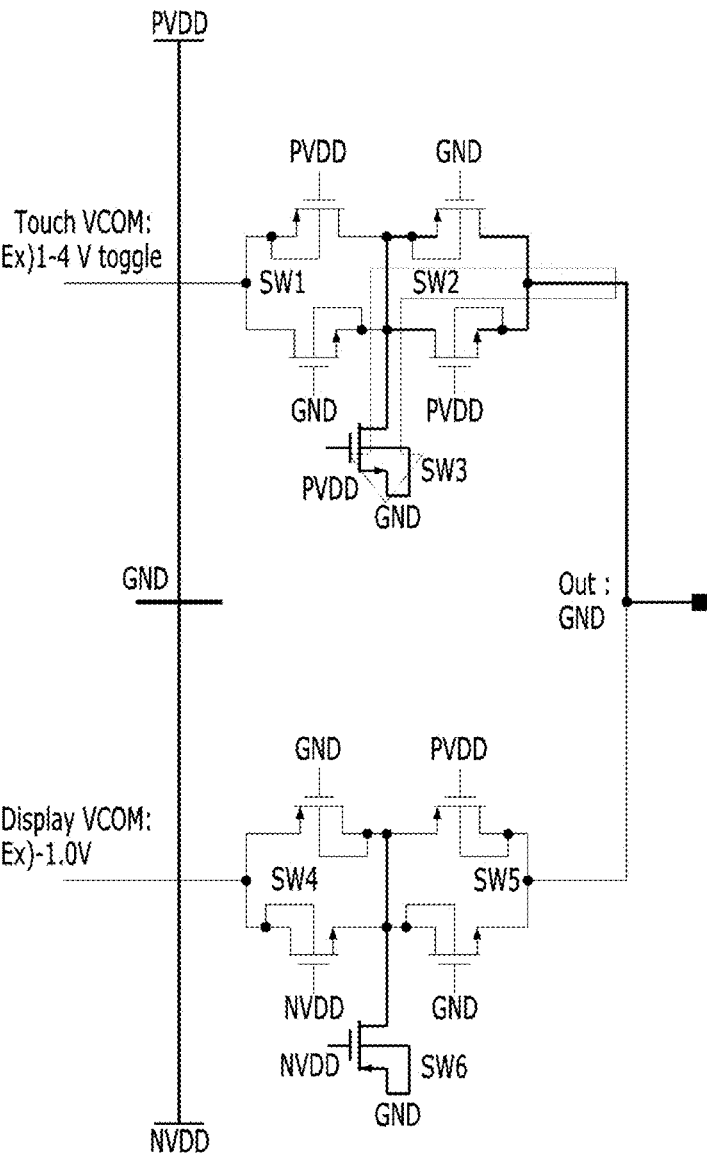
Figure 10F:
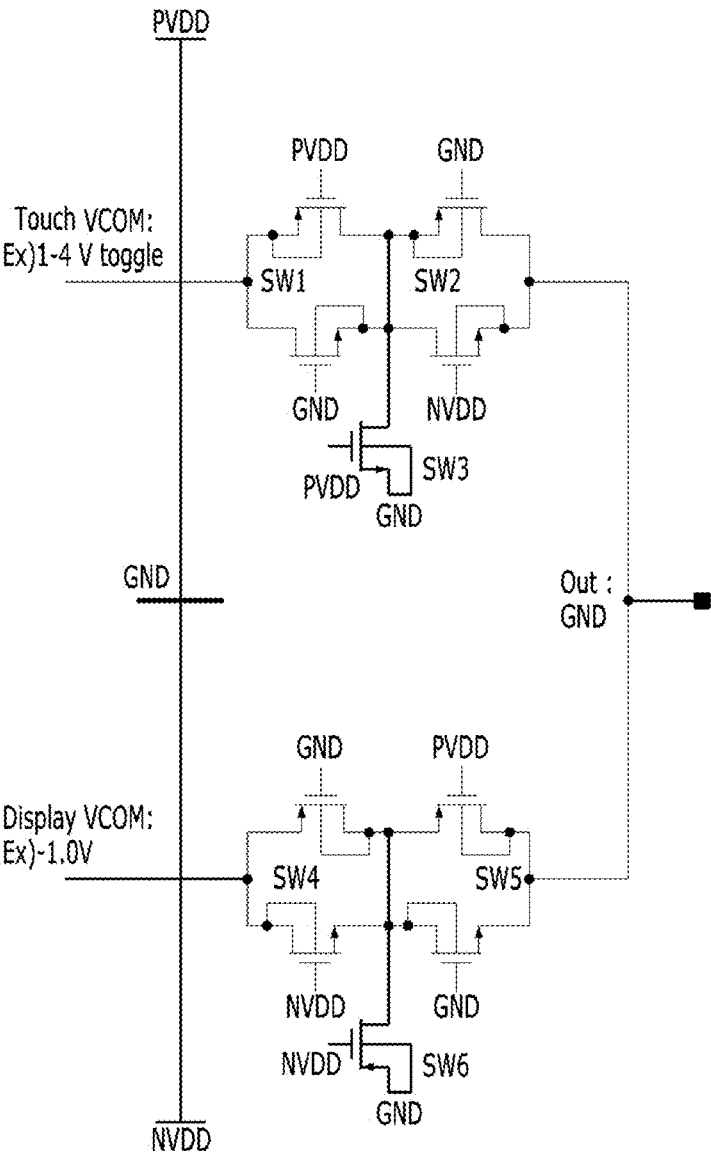

According to one embodiment, the multiplexer 443 may be controlled to operate as illustrated in FIG. 10A in the time period "a", operate as illustrated in FIG. 10B in the time period "b", operate as illustrated in FIG. 10C in the time period "c", operate as illustrated in FIG. 10D in the time period "d", operate as illustrated in FIG. 10E in the time period "e", and operate as illustrated in FIG. 10F in the time period "f". For example, the multiplexer 443 of FIG. 8 may be controlled so that voltages as shown in Table 1 are applied to the gate terminals of the first switch SW1, the second switch SW2, and the third switch SW3 included in the multiplexer 443.

TABLE 1

| Mode | Period | SW1 (PMOS/ NMOS) | SW2 (PMOS/ NMOS) | SW3 (PMOS/ NMOS) | Output status |
|---|---|---|---|---|---|
| Display Mode | a | PVDD/GND | GND/NVDD | PVDD | Display VCOM |
| Touch sensing mode | b | PVDD/GND | GND/NVDD | PVDD | GND discharge |
| | c | PVDD/GND | GND/NVDD | PVDD | Floating |
| | d | GND/PVDD | GND/PVDD | GND | Touch VCOM |
| | e | PVDD/GND | GND/PVDD | PVDD | GND discharge |
| | f | PVDD/GND | GND/NVDD | PVDD | Floating |

In addition, the multiplexer 443 of FIG. 8 may be controlled so that voltages as shown in Table 2 are applied to the gate terminals of the fourth switch SW4, the fifth switch SW5, and the sixth switch SW6 included in the multiplexer 443.

TABLE 2

| Mode | Period | SW4 (PMOS/ NMOS) | SW5 (PMOS/ NMOS) | SW6 (PMOS/ NMOS) | Output status |
|---|---|---|---|---|---|
| Display Mode | a | NVDD/GND | NVDD/GND | GND | Display VCOM |
| Touch sensing mode | b | GND/NVDD | NVDD/GND | NVDD | GND discharge |
| | c | GND/NVDD | PVDD/GND | NVDD | Floating |
| | d | GND/NVDD | PVDD/GND | NVDD | Touch VCOM |
| | e | GND/NVDD | PVDD/GND | NVDD | GND discharge |
| | f | GND/NVDD | PVDD/GND | NVDD | Floating |

Hereinafter, each operation of FIGS. 10A to 10F will be described with reference to FIGS. 9, Tables 1 and 2. Referring to FIG. 10A, the multiplexer 443 may output a display driving signal in the time period "a". For example, in the time period "a", a PVDD voltage is applied to the gate terminal of the P-type transistor of the first switch SW1, the gate terminal of the N-type transistor is grounded, the gate terminal of the P-type transistor of the second switch SW2 is grounded, and an NVDD voltage is applied to the gate terminal of the N-type transistor, so that no current flows through the first switch SW1 and the second switch SW2. The PVDD voltage may be applied to the gate terminal of the third switch SW3.

In addition, in the time period "a", an NVDD voltage is applied to the gate terminals of the P-type transistors of the fourth switch SW4 and the fifth switch SW5, and the gate terminal of the N-type transistor is grounded to allow current to flow through the fourth switch SW4 and the fifth switch SW5. Accordingly, the multiplexer 443 may output a display driving signal (e.g., a voltage signal of –1V).

Referring to FIG. 10B, the multiplexer 443 may perform a discharge operation of the display driving signal in the time period "b". For example, in the time period "b", the gate terminal of the P-type transistor of the fourth switch SW4 is switched from the NVDD voltage to the ground state, the NVDD voltage is applied to the gate terminal of the N-type transistor in the ground state, and the NVDD voltage is applied to the gate terminal of the sixth switch SW6, so that current flows through the ground GND of the sixth switch SW6 from the fifth switch SW5 to discharge the display driving signal.

Referring to FIG. 10C, the multiplexer 443 may maintain a floating state in the time period "c". For example, in the time period "c", the voltage applied to the gate terminal of the P-type transistor of the fifth switch SW5 is converted from the NVDD voltage to the PVDD voltage, so that no current flows through the fourth switch SW4 and the fifth switch SW5 to maintain the floating state.

Referring to FIG. 10D, the multiplexer 443 may output a touch driving signal and sense a touch signal in the time period "d". For example, in the time period "d", as the gate terminals of the P-type transistors of the first switch SW1 and the second switch SW2 are in a ground state, and a PVDD voltage is applied to the gate terminal of the N-type transistor, current flows through the first switch SW1 and the second switch SW2. The gate terminal of the third switch SW3 may be in a ground state. Accordingly, the multiplexer 443 may output a toggled touch driving signal (e.g., a voltage signal of 1V to 4V).

Referring to FIG. 10E, the multiplexer 443 may perform a discharging operation of the touch driving signal in the time period "e". For example, in the time period "e", a PVDD voltage is applied to the gate terminal of the P-type transistor of the first switch SW1 in a ground state, and the gate terminal of the N-type transistor is switched to a ground state from the state in which the PVDD voltage is applied, and a PVDD voltage is applied to the gate terminal of the third switch SW3 in the ground state, so that current may flow through the ground GND of the first switch SW1 from the second switch SW2 to discharge the touch driving signal.

Referring to FIG. 10F, the multiplexer 443 may maintain a floating state in the time period "f". For example, in the time period "f", the voltage applied to the gate terminal of the N-type transistor of the second switch SW2 is converted from the PVDD voltage to the NVDD voltage, no current flows through the second switch SW2 and the third switch SW3 to maintain the floating state.

Figure 11:
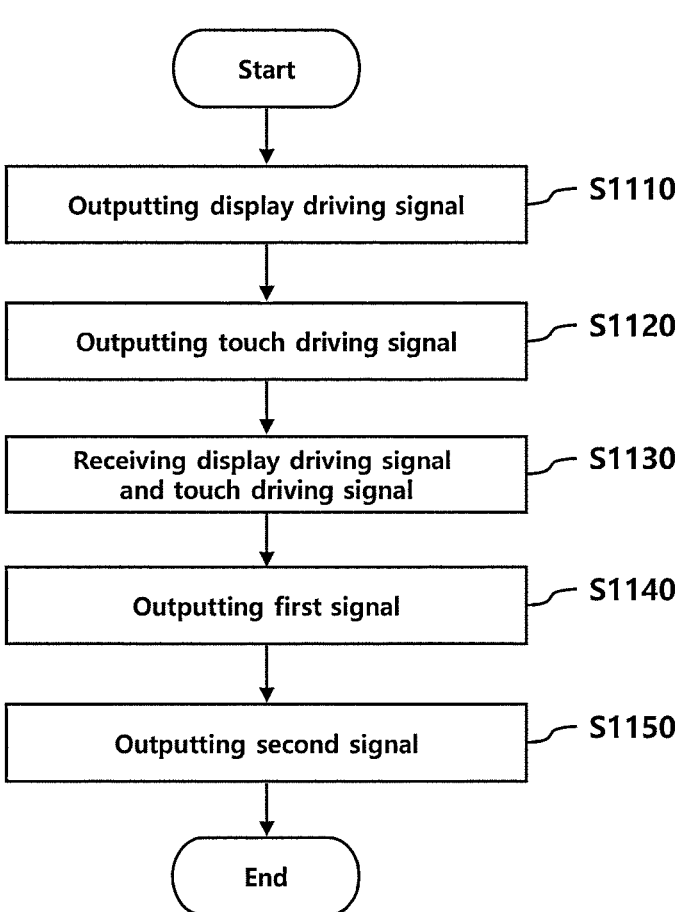
FIG. 11 is a flowchart illustrating a method of operating the touch display device according to one embodiment.

FIG. 11 is a flowchart illustrating a method of operating the touch display device according to one embodiment. Referring to FIG. 11, in the touch display device, the power management circuit outputs a display driving signal based on a synchronization signal (e.g., a display synchronization signal or a touch synchronization signal) received from the touch control circuit (Step 1110). The display driving signal may have the first voltage range (e.g., –1V).

In addition, in the touch display device, the touch modulation circuit outputs a touch driving signal based on the synchronization signal (e.g., the display synchronization signal or the touch synchronization signal) received through the touch control circuit (step 1120). The touch driving signal may have the second voltage range (e.g., 1V to 4V).

In the touch display device, the driving signal output circuit receives the display driving signal from the power management circuit and receives the touch driving signal from the touch modulation circuit (Step 1130).

In the touch display device, the driving signal output circuit outputs a first signal based on the display driving signal in a first time period (Step 1140).

In the touch display device, the driving signal output circuit outputs a second signal based on the touch driving signal in a second time period (Step 1150).

15

What is claimed is:

1. A driving signal output circuit, comprising:
a display driving signal output circuit configured to operate in a first voltage range, receive a display driving signal having the first voltage range through a first terminal, and output a first signal based on the received display driving signal to a panel in a first time period;
a touch driving signal output circuit configured to operate in a second voltage range, receive a touch driving signal having the second voltage range through a second terminal, and output a second signal based on the received touch driving signal in a second time period different from the first time period; and
a level shifter, wherein the level shifter is configured to:
receive a logical signal with a predefined voltage, converts the logical signal into a voltage including the first voltage range, and output the converted logical signal including the first voltage range to the display driving signal output circuit to selectively output the display driving signal based on the voltage including the first voltage range to a panel; and
receive the logical signal, convert the logical signal into a voltage including the second voltage range, and output the converted logical signal including the second voltage range to the touch driving signal output circuit to selectively output the touch driving signal based on the voltage including the second voltage range to the panel,
wherein the converted logical signal in the first voltage range and the converted logical signal in the second voltage range are separately and respectively processed in the display driving signal output circuit and the touch driving signal output circuit in mutually independent signal paths that are not commonly used for both the first voltage range and the second voltage range.

2. The driving signal output circuit of claim 1, wherein the display driving signal output circuit is configured to receive a touch synchronization signal from a touch control circuit and selectively outputting the first signal or the second signal based on the received touch synchronization signal.

3. The driving signal output circuit of claim 1, wherein the touch driving signal output circuit comprises:
a first switch for receiving the touch driving signal having the second voltage range;
a second switch, connected in series with the first switch, for receiving the touch driving signal from the first switch and outputting the second signal to the panel; and
a third switch connected between the first switch and the second switch,
wherein the third switch is controlled to discharge in order to prevent a voltage exceeding a breakdown voltage from being applied to the first switch or the second switch in at least some time periods in which the second signal is not output through the second switch.

4. The driving signal output circuit of claim 3, wherein the first switch includes a P-type transistor and an N-type transistor connected in parallel with the P-type transistor, and
wherein the second switch includes a P-type transistor and an N-type transistor connected in parallel with the P-type transistor.

5. The driving signal output circuit of claim 3, wherein the third switch includes an N-type transistor.

6. The driving signal output circuit of claim 1, wherein the display driving signal output circuit comprises:
a fourth switch for receiving the display driving signal having the first voltage range;
a fifth switch, connected in series with the fourth switch, for receiving the display driving signal from the fourth switch and outputting the first signal to the panel; and
a sixth switch connected between the fourth switch and the fifth switch,
wherein the sixth switch is controlled to discharge in order to prevent a voltage exceeding a breakdown voltage from being applied to the fourth switch and the fifth switch in at least some time periods in which the first signal is not output through the fifth switch.

7. The driving signal output circuit of claim 6, wherein the fourth switch includes a P-type transistor and an N-type transistor connected in parallel with the P-type transistor, and
wherein the fifth switch includes a P-type transistor and an N-type transistor connected in parallel with the P-type transistor.

8. The driving signal output circuit of claim 6, wherein the sixth switch includes a P-type transistor.

9. A touch display device comprising:
a touch control circuit configured to generate a touch synchronization signal;
a power management circuit configured to receive the touch synchronization signal from the touch control circuit and output a display driving signal having a first voltage range based on the received touch synchronization signal;
a touch modulation circuit configured to receive the touch synchronization signal from the touch control circuit and output a touch driving signal having a second voltage range based on the received touch synchronization signal; and
a driving signal output circuit configured to receive the display driving signal having the first voltage range from the power management circuit, receive the touch driving signal having the second voltage range from the touch modulation circuit, output a first signal based on the received display driving signal in a first time period, and output a second signal based on the received touch driving signal in a second time period different from the first time period,
wherein the driving signal output circuit includes a level shifter,
wherein the level shifter is configured to:
receive a logical signal with a predefined voltage, converts the logical signal into a voltage including the first voltage range, and output the converted logical signal including the first voltage range to the driving signal output circuit to selectively output the display driving signal based on the voltage including the first voltage range to a panel; and
receive the logical signal, convert the logical signal into a voltage including the second voltage range, and output the converted logical signal including the second voltage range to the driving signal output circuit to selectively output the touch driving signal based on the voltage including the second voltage range to the panel,
wherein the converted logical signal in the first voltage range and the converted logical signal in the second voltage range are separately and respectively processed in the driving signal output circuit in respective mutually independent signal paths that are not commonly used for both the first voltage range and the second voltage range.

10. The touch display device of claim 9, wherein the driving signal output circuit is configured to receive the touch synchronization signal from the touch control circuit and selectively output the first signal or the second signal based on the received touch synchronization signal.

11. The touch display device of claim 9, wherein the driving signal output circuit is configured to receive the display driving signal having the first voltage range output from the power management circuit through a first terminal and receive the touch driving signal having the second voltage range output from the touch modulation circuit through a second terminal.

12. The touch display device of claim 11, wherein the driving signal output circuit comprises:

a display driving signal output circuit configured to operate in the first voltage range, receive the display driving signal having the first voltage range, and output the first signal to a panel based on the touch synchronization signal; and a touch driving signal output circuit configured to operate in the second voltage range, receive the touch driving signal having the second voltage range, and output the second signal to the panel based on the touch synchronization signal.

13. The touch display device of claim 12, wherein the touch driving signal output circuit comprises:

a first switch for receiving the touch driving signal having the second voltage range;

a second switch, connected in series with the first switch, for receiving the touch driving signal from the first switch and outputting the second signal to the panel; and a third switch connected between the first switch and the second switch, wherein the third switch is controlled to discharge in order to prevent a voltage exceeding a breakdown voltage from being applied to the first switch or the second switch in at least some time periods in which the second signal is not output through the second switch.

14. The touch display device of claim 13, wherein the second voltage range includes 1V to 4V.

15. The touch display device of claim 12, wherein the display driving signal output circuit comprises:

a fourth switch for receiving the display driving signal having the first voltage range;

a fifth switch, connected in series with the fourth switch, for receiving the display driving signal from the fourth switch and outputting the first signal to the panel; and a sixth switch connected between the fourth switch and the fifth switch, wherein the sixth switch is controlled to discharge in order to prevent a voltage exceeding a breakdown voltage from being applied to the fourth switch and the fifth switch in at least some time periods in which the first signal is not output through the fifth switch.

16. The touch display device of claim 15, wherein the first voltage range includes −1V.

17. A driving signal output method of a touch display device, the method comprising:

receiving a display driving signal having a first voltage range from a power management circuit;

receiving a touch driving signal having a second voltage range from a touch modulation circuit;

outputting a first signal based on the received display driving signal to a panel in a first time period;

outputting a second signal based on the received touch driving signal to the panel in a second time period different from the first time period; and performing a discharge in order to prevent a voltage exceeding a breakdown voltage from being applied in at least some time periods in which the first signal or the second signal is not output, wherein the outputting a first signal based on the received display driving signal to a panel in the first time period comprises receiving a logical signal with a predefined voltage, converting the logical signal into a voltage including the first voltage range, and outputting the converted logical signal including the first voltage range to a multiplexer to selectively output the display driving signal based on the voltage including the first voltage range to a panel; and outputting a second signal based on the received touch driving signal to the panel in a second time period different from the first time period comprises receiving the logical signal, converting the logical signal into a voltage including the second voltage range, and outputting the converted logical signal including the second voltage range to the multiplexer to selectively output the touch driving signal based on the voltage including the second voltage range to the panel, wherein the converted logical signal in the first voltage range and the converted logical signal in the second voltage range are separately and respectively processed in the multiplexer in respective mutually independent signal paths that are not commonly used for both the first voltage range and the second voltage range.

18. The driving signal output method of claim 17, wherein a touch synchronization signal is received from a touch control circuit and the first signal or the second signal is selectively output based on the received touch synchronization signal.

19. The driving signal output method of claim 17, further comprising:

outputting to the panel the touch driving signal received from a first switch through a second switch connected in series with the first switch, wherein a third switch connected between the first switch and the second switch is controlled to discharge so that the voltage exceeding the breakdown voltage is not applied to the first switch or the second switch in at least some time periods in which the second signal is not output through the second switch.

* * * * *